United States Patent Office 2,856,015
Patented Oct. 14, 1958

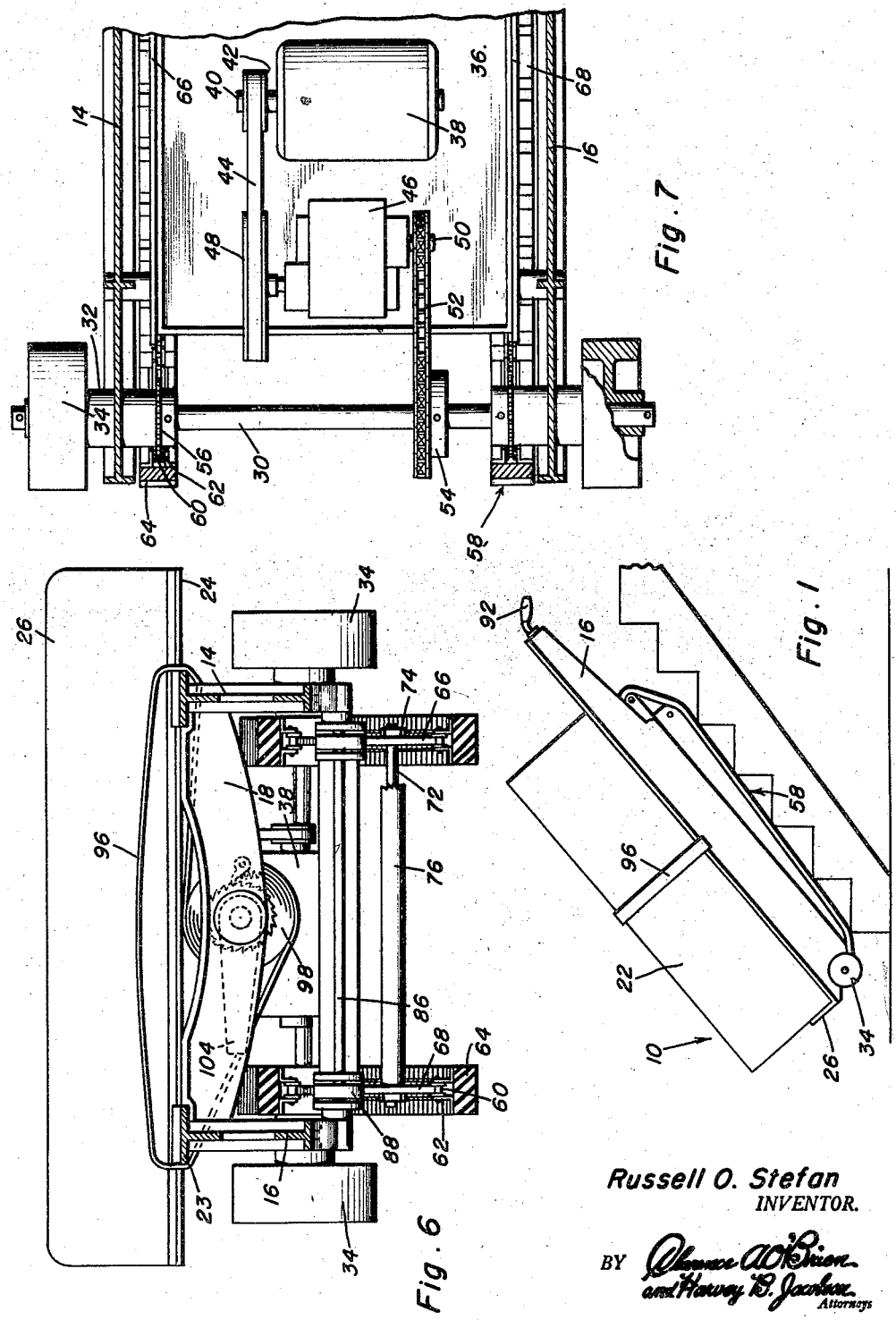

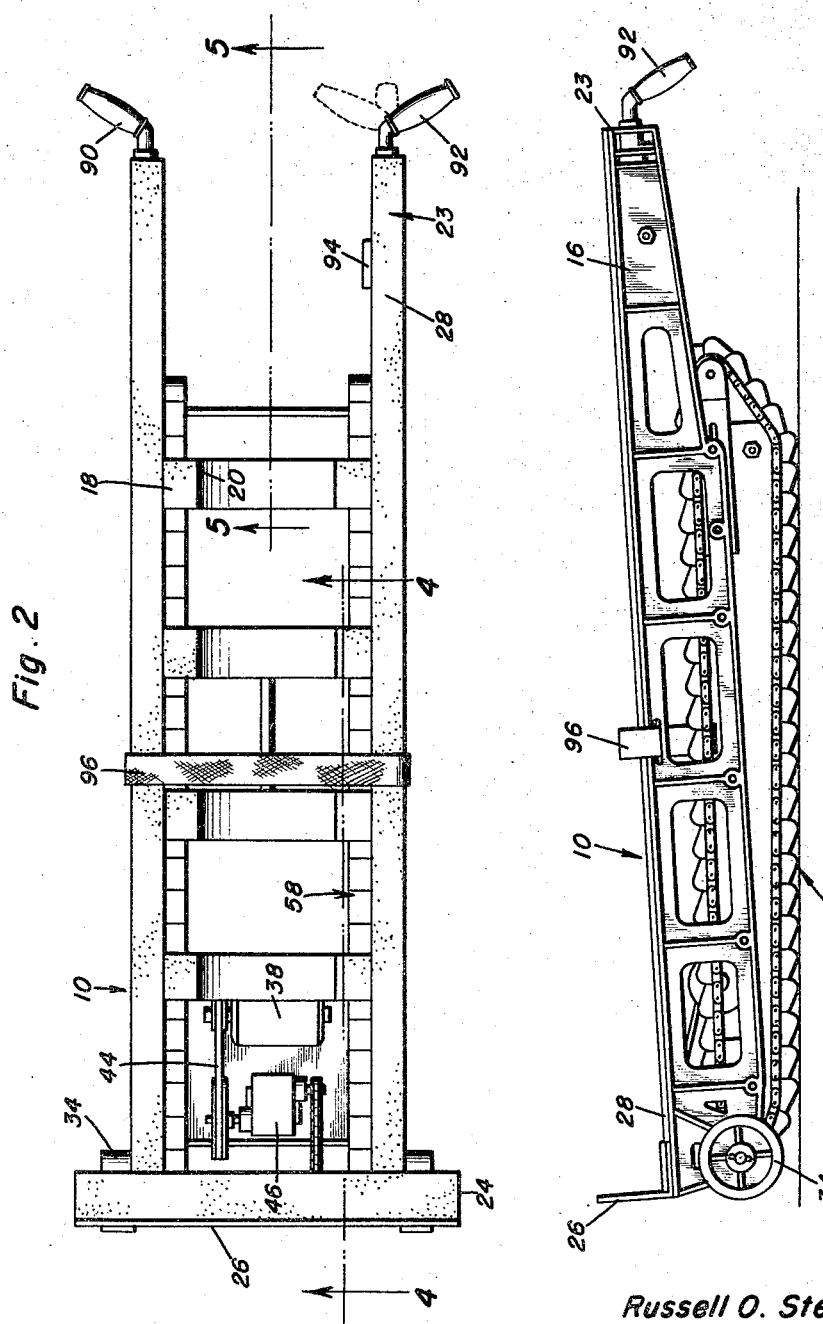

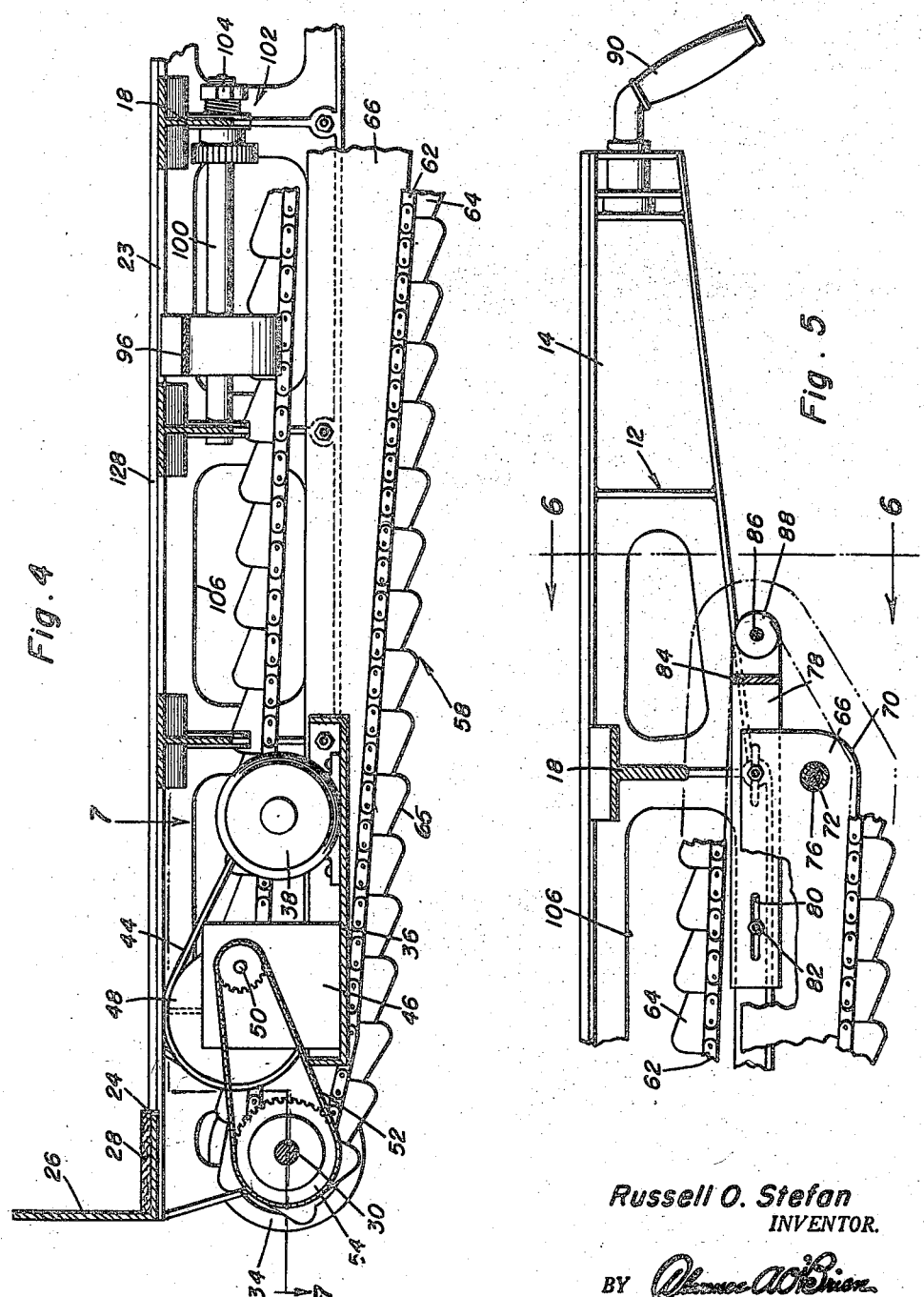

2,856,015

POWERED STAIR CLIMBER

Russell O. Stefan, Downey, Calif.

Application February 2, 1956, Serial No. 562,999

2 Claims. (Cl. 180—9.1)

This invention generally relates to a stair climber and more specifically provides a powered stair climber, especially designed for conveying articles up and down stairs, over curbs or the like as well as along straight surfaces and includes powered endless track members as well as powered wheels to assist in the climbing operation of the stair climber.

An object of the present invention is to provide a vehicle in the form of a stair climber generally shaped as a hand truck which includes powered wheels at one end thereof and handles at the other end thereof together with endless tracks which are driven for assisting the climbing operation whereby the device may be powered up or down stairs and over curbs or other similar obstructions such as an inclined tailgate of a truck or any other inclined ramp.

Another object of the present invention is to provide a vehicle having a load supporting platform together with a tie-down strap having a reel mechanism mounted on the vehicle for tightening the strap for securely binding the load to the device.

A further object of the present invention is to provide a stair climber in accordance with the preceding object having a swively mounted handle incorporating an electric switch therein whereby movement of the handle will control the movement of the stair climber.

Yet another object of the present invention is to provide a powered stair climber including an electric motor driving through a reduction gear mechanism for providing power to a pair of forward wheels together with a pair of endless tracks for motivating the climber.

A still further object of the present invention is to provide a stair climber including a pair of endless tracks or treads having a lower run forming the ground-engaging portion thereof together with a pair of forward wheels which will be out of engagement of the ground surface when the lower run of the tracks are disposed substantially on such a flat surface, wherein the wheels also will assist in traveling over obstructions and also enabling the device to be employed as a hand truck or as a cargo carrier having a flat upper surface for supporting a load thereon for conveying the load in a conventional manner.

Other important objects of the present invention will reside in its simplicity of construction, efficiency of operation, ruggedness, adaptation for various utilities and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing a schematic illustration of the present invention being employed for moving a load in association with a stairway;

Figure 2 is a top plan view of the stair climber of the present invention;

Figure 3 is a side elevational view of the stair climber illustrating the relationship of the lower runs of the tracks and the front wheels;

Figure 4 is a longitudinal sectional view on an enlarged scale taken substantially upon a plane passing along section line 4—4 of Figure 2 illustrating the details of construction of the drive mechanism and the ratchet mechanism as well as the details of the track;

Figure 5 is a detail sectional view, on an enlarged scale, taken substantially upon a plane passing along section line 5—5 of Figure 2 illustrating further details of the frame and the track adjusting means;

Figure 6 is a transverse vertical sectional view taken substantially upon a plane passing along section line 6—6 of Figure 5 illustrating the construction of the tensioning rollers together with the relationship of the wheels and tracks and the load binding mechanism; and Figure 7 is a plan sectional view taken substantially upon a plane taken along section line 7—7 of Figure 4 illustrating the construction of the drive mechanism.

Referring now specifically to the drawings, the numeral 10 generally designates the powered stair climber of the present invention which includes a generally elongated rectangular frame generally designated by the numeral 12 which includes longitudinal frame rails 14 and 16 interconnected by transverse rails 18 having a recessed central portion 20 for accommodating any projections on a load such as the article 22 which may be in the form of a refrigerator, stove, piano or other heavy articles in the form of furniture or appliances which normally are taken up or down steps when such articles are purchased or when persons are moving from one location to another.

The longitudinal rails 14 and 16 are provided with transversely extending upper edges 23 which combine with a transverse member 24 on the forward end thereof which has an upstanding forward ledge 26 to form a load carrying platform. If desired, the edges 23 and the portion of the member 24 coextensive therewith may be provided with cushion material 28. The cushion material 28 prevents scratches or other damage to the articles being carried by the stair climber of the present invention.

Supported transversely of the forward end of the frame 12 is an axle 30 which is journaled in bearings 32 secured to the side rails 14 and 16. Ground engaging wheels 34 are secured to the axle 30 at remote ends thereof and are disposed outwardly of the side rails 14 and 16. Disposed between the side rails 14 and 16 is a supporting platform 36 on which is mounted an electric motor 38 having a drive shaft 40 extending therefrom with a V-belt pulley 42 mounted thereon for encircling engagement by a V-belt 44 whereby the V-belt 44 will be driven by the electric motor 38. A reduction gear mechanism 46 is mounted on the platform or plate 36 and includes an enlarged V-belt pulley 48 in alignment with the V-belt pulley 42 for receiving the endless V-belt 44 for transferring driving force to the reduction gear 46. The reduction gear 46 has an output shaft 50 having a sprocket gear thereon for engagement by a sprocket chain 52 which encircles a sprocket gear 54 mounted on the axle 30 thereby driving the axle 30 at a reduced rate of speed depending upon the reduction ratio of the reduction gear 46 and the ratios of the various pulleys and sprocket gears whereby the wheels 34 will be driven at a desired reduced rate of speed.

Disposed on the axle 30 inwardly of the side rails 14 and 16 is a pair of sprocket-type gears 56 having an endless track generally designated by the numeral 58 positioned in encircling relation thereto. The tracks 58 are identical and each includes projecting lugs 60 for engagement with the sprocket gear 56 together with flanges 62 engaging the edges of the gear 56 for guiding the track 58 in relation to the sprocket gears 56. The lugs 60 are disposed transversely of the flanges 62 which are actually the links of a sprocket chain having a plurality of track pads of resilient material and designated by the numeral 64 mounted thereon wherein the chains formed by the flanges or links 62 and the track pads 64 form a pair of endless tracks with the forward end thereof encircling the sprocket gears 56.

Mounted along the inner edges of the side rails 14 and 16 is a pair of side plates 66 and 68 which are in alignment with the rollers or lugs 60 with the lower edge of these plates forming a guide and support for the lower run of the tracks 58. The rear lower corners of the plates 66 and 68 are rounded as designated by the numeral 70 and are spaced by a tie rod 72 extending through the plates and provided with nuts 74 on the outer end thereof and a spacer tube 76 therebetween for retaining the plates 66 and 68 in rigid spaced relation for engagement by the rollers 60 and the flanges 62 forming the links of the chain.

On each of the plates 66 and 68 at the rear upper corner thereof is provided a longitudinally extending plate member 78 having a pair of longitudinally elongated slots 80 for attachment to the respective plates 66 and 68 in an adjustable manner by fastening members 82. The outer ends of the plate member 78 are interconnected by a transverse brace 84 forming a rigid extensible end for the plates 66 and 68.

Extending transversely of the outer free ends of the plate member 78 is a transverse shaft or rod 86 having idler rollers 88 mounted adjacent each end thereof for rotation and for engagement with the lugs or rollers 60 of the chain formed by the link flanges 62 whereby the tension of the tracks 58 may be adjusted and the upper run of the tracks 58 will be substantially straight while the lower run is inclined between the idler rollers 88 and the curved edges 70 of the plates 66 and 68 and then is slightly inclined forwardly for encircling the sprocket gears 56 which drive the tracks 58.

Accordingly, it will be seen that the electric motor 38 provides driving power for the wheels 34 and the tracks 58 whereby the tracks 58 will engage a supporting surface when it is inclined or when it is flat and when the lower run of the tracks 58 engage a flat supporting surface as illustrated in Figure 3, the wheels 34 will normally be out of engagement with the supporting surface whereby any inclined surface encountered by the stair climber will first engage the wheels 34 which will tend to lift the entire front end of the stair climber upwardly on to said construction. If the device is proceeding in the other direction, the inclined portion of the tracks 58 from the rollers 88 to the bottom rear edges of the plates 66 and 68 form an inclined surface for moving the entire apparatus upwardly along such an obstruction. The track pads 64 are illustrated in Figure 4 as being provided with inclined outward surfaces 65 but any type of track pads may be provided for movement over stairs in a most effective manner.

On the end of each side rail 14 and 16 is an outwardly inclined handle member 90 and 92 with the handle member 92 being swivelly mounted for cooperation with a reversing switch 94 whereby movement of the handle 92 will operate the electric motor 38 in a forward or reverse direction and will also render the electric motor 38 inoperative. While the details of the switch mechanism have not been illustrated, it will be understood that any suitable type of switch mechanism may be employed and an electrical supply cord will be necessary which also has not been illustrated.

For holding the article to be carried, such as the article 22 to the supporting platform formed by the plates 23 on the upper edges of the rails 14 and 16, an elongated flexible strap 96 is provided with the strap 96 being terminally secured to a reel 98 attached to a shaft 100 disposed between two adjacent transverse braces 18. A ratchet handle mechanism generally designated by the numeral 102 is provided and a laterally extending handle 104 is connected to the ratchet mechanism 102 for rotating the shaft 100 for winding the strap 96 thereon from each end thereof for securely binding the article 22 to the stair climber 10. While the specific details of the ratchet mechanism 102 are not specifically illustrated, it will be understood that any type of ratchet mechanism having means for releasing the same may be provided and any type of control mechanism may be provided whereby the ratchet mechanism may even be operated from a position adjacent the handles 90 or 92.

Also, it will be noted that the longitudinal rails 14 and 16 may be provided with enlarged openings 106 for lightening the entire structure wherein the side rails 16 and 14 are normally of I-beam construction.

Also, any type of motor, such as a battery operated motor, internal combustion engine, or spring wound motor, may be employed for supplying the device with power.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-propelled stair climbing vehicle comprising a generally rectangular frame, a transverse axle rotatably journaled on said frame adjacent one end thereof, a wheel mounted on each end of said axle for rotation therewith, said frame having a load supporting platform on the upper surface thereof, handle means extending longitudinally of the other end of the frame for controlling the position of the other end of the frame, powered drive means connected with the axle for rotating the axle and wheels when the other end of the frame is elevated thereby forming a powered hand cart, a pair of sprocket gears mounted rigidly on said axle, a pair of idler rollers adjustably mounted on said frame in alignment with the sprocket gears for movement toward and away from the axle, an endless sprocket track chain encircling each aligned pair of gears and rollers, a plurality of track pads mounted on each of said chains, said chains, gears and rollers being disposed adjacent the opposite side edges of the frame, an elongated guide plate engaging the inner surface of the lower run of each of the chains, said guide plates being mounted on said frame for supporting the lower run of the chains, the plane of the outer surfaces of the track pads in the lower run of the chains being disposed below the plane of the periphery of the wheels whereby the track pads will propel the frame over a surface when the frame is in substantially parallel relation with the surface and enabling the vehicle to climb stairs in which the front edges of the stair treads form points on an inclined surface, said handle means including means controlling operation of said powered drive means.

2. A self-propelled stair climbing vehicle comprising a generally rectangular frame, a transverse axle rotatably journaled on said frame adjacent one end thereof, a wheel mounted on each end of said axle, said frame having a load supporting platform on the upper surface thereof, handle means extending longitudinally of the other end of the frame for controlling the position of the other end of the frame, powered drive means connected with the axle for rotating the axle, a pair of sprocket gears mounted rigidly on said axle, a pair of idler rollers adjustably mounted on said frame in alignment with the sprocket gears for movement toward and away from the axle, an endless sprocket track chain encircling each aligned pair of gears and rollers, a plurality of track pads mounted on each of said chains, said chains, gears and rollers being disposed adjacent the opposite side edges of the frame, an elongated guide plate engaging the inner surface of the lower run of each of the chains, said guide plates being mounted on said frame for supporting the lower run of the chains, the plane of the outer surfaces of the track pads in the lower run of the chains being disposed below the plane of the periphery of the wheels whereby the track pads will propel the frame over a surface when the frame is in substantially parallel relation with the surface and enabling the vehicle to climb stairs in which the front edges of the stair treads form points on an inclined surface, said handle means including means controlling operation of said powered drive means, the radius of the extremities of said track pads where they pass around said axle being less than the radius of the periphery of said wheels.

References Cited in the file of this patent

UNITED STATES PATENTS

| | | |
|---|---|---|
| 970,787 | Brown | Sept. 20, 1910 |
| 1,320,562 | Martin | Nov. 4, 1919 |
| 2,165,603 | Yeats | July 11, 1939 |
| 2,214,311 | Stevens | Sept. 10, 1940 |
| 2,417,613 | Radabaugh | Mar. 18, 1947 |
| 2,620,041 | Chenette et al. | Dec. 2, 1952 |
| 2,706,008 | Voigt | Apr. 12, 1955 |
| 2,740,484 | Montana | Apr. 3, 1956 |
| 2,770,310 | Gates | Nov. 13, 1956 |